United States Patent
Basu et al.

(10) Patent No.: US 10,740,731 B2
(45) Date of Patent: Aug. 11, 2020

(54) THIRD PARTY SETTLEMENT

(71) Applicant: Visa International Service Association, San Francisco, CA (US)

(72) Inventors: Gourab Basu, Half Moon Bay, CA (US); Michael Mori, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 505 days.

(21) Appl. No.: 14/146,638

(22) Filed: Jan. 2, 2014

(65) Prior Publication Data

US 2014/0188710 A1     Jul. 3, 2014

Related U.S. Application Data

(60) Provisional application No. 61/748,239, filed on Jan. 2, 2013.

(51) Int. Cl.
  *G06Q 40/00* (2012.01)
  *G06Q 20/02* (2012.01)

(52) U.S. Cl.
  CPC .................. *G06Q 20/023* (2013.01)

(58) Field of Classification Search
  CPC ............................ G06Q 20/10; G06Q 20/102
  USPC ................................................. 705/39, 40, 35
  See application file for complete search history.

(56) References Cited

U.S. PATENT DOCUMENTS

| | | |
|---|---|---|
| 3,931,497 A | 1/1976 | Gentile et al. |
| 5,613,012 A | 3/1997 | Hoffman |
| 5,781,438 A | 7/1998 | Lee |
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |

(Continued)

FOREIGN PATENT DOCUMENTS

| | | |
|---|---|---|
| EP | 2156397 A1 | 2/2010 |
| WO | 2001035304 A1 | 5/2001 |

(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

(Continued)

*Primary Examiner* — Scott S Trotter
(74) *Attorney, Agent, or Firm* — Kilpatrick Townsend & Stockton LLP

(57) ABSTRACT

A method includes receiving, at a server computer, first a clearing request message, where the clearing request message comprises a transaction identifier; generating a second clearing request message and transmitting the second clearing request message to a first computer, the second clearing request message including a first derived transaction identifier derived from the transaction identifier; and generating a third clearing request message and transmitting the third clearing request message to a second computer, the third clearing request message including a second derived transaction identifier derived from the transaction identifier.

20 Claims, 7 Drawing Sheets

(56) References Cited

U.S. PATENT DOCUMENTS

| | | |
|---|---|---|
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,423,457 B1 | 4/2013 | Schattauer |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |

(56) References Cited

U.S. PATENT DOCUMENTS

| | | |
|---|---|---|
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,655,775 B1 * | 2/2014 | Howe .................... 705/39 |
| 8,656,180 B2 | 2/2014 | Shablygin |
| 8,751,391 B2 | 6/2014 | Freund |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0078785 A1 | 4/2003 | Antonello |
| 2003/0079220 A1 | 4/2003 | Bruner |
| 2003/0130955 A1 | 7/2003 | Hawthorne |
| 2003/0149625 A1 | 8/2003 | Leonardi |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0083184 A1 | 4/2004 | Tsuei |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0215536 A1 | 10/2004 | Deliwala |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0011044 A1 | 1/2007 | Hansen |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0226159 A1 | 9/2007 | Duan |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0154772 A1 | 6/2008 | Carlson |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0319353 A1 | 12/2009 | Palmeri |
| 2009/0327131 A1 | 12/2009 | Beenau |
| 2010/0008535 A1 | 1/2010 | Abulafia |
| 2010/0057611 A1 | 3/2010 | Antoo |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161404 A1 | 6/2010 | Taylor |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0274653 A1 | 10/2010 | Hammad |
| 2010/0291904 A1 | 11/2010 | Musfeldt |
| 2010/0299267 A1 | 11/2010 | Faith et al. |
| 2010/0299364 A1 | 11/2010 | Baldwin |
| 2010/0306076 A1 | 12/2010 | Taveau |
| 2010/0312626 A1 | 12/2010 | Cervenka |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |

(56) References Cited

U.S. PATENT DOCUMENTS

| | | |
|---|---|---|
| 2011/0087596 A1 | 4/2011 | Dorsey |
| 2011/0093397 A1 | 4/2011 | Carlson |
| 2011/0125597 A1 | 5/2011 | Oder, II |
| 2011/0137797 A1* | 6/2011 | Stals et al. .................... 705/44 |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078795 A1 | 3/2012 | Mann, III |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0101881 A1 | 4/2012 | Taylor |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143768 A1 | 6/2012 | Hammad et al. |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0191977 A1 | 7/2012 | Foster |
| 2012/0197801 A1 | 8/2012 | Jimenez |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2012/0330827 A1 | 12/2012 | Marshall |
| 2012/0330837 A1* | 12/2012 | Persaud et al. ................. 705/44 |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173367 A1 | 7/2013 | Beighley, Jr. |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226684 A1 | 8/2013 | Hammad |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0288499 A1 | 9/2013 | Hammad |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0268333 A1 | 10/2013 | Bjorn et al. |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332251 A1 | 12/2013 | Ioannidis |
| 2013/0332344 A1 | 12/2013 | Weber |
| 2013/0339238 A1 | 12/2013 | Unland |
| 2013/0339253 A1 | 12/2013 | Sincai |

(56) References Cited

U.S. PATENT DOCUMENTS

| | | |
|---|---|---|
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0164254 A1 | 6/2014 | Dimmick |
| 2014/0188586 A1 | 7/2014 | Carpenter et al. |
| 2014/0188725 A1* | 7/2014 | Reardon ........................ 705/44 |
| 2014/0294701 A1 | 10/2014 | Dai et al. |
| 2014/0297390 A1 | 10/2014 | Grindel |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012/166790 A1 | 12/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.
Sharma et al., U.S. Appl. No. 62/003,717 (unpublished), Mobile Merchant Application filed May 28, 2014.
Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request via Access Device filed Nov. 25, 2015.
Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.

(56) References Cited

OTHER PUBLICATIONS

Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Non-final Office Action, dated Apr. 15, 2016, U.S. Appl. No. 14/146,655.

* cited by examiner

THIRD PARTY SETTLEMENT

CROSS-REFERENCES TO RELATED APPLICATIONS

The present application is a non-provisional application of and claims priority to U.S. Provisional Application No. 61/748,239 titled "THIRD PARTY SETTLEMENT SYSTEM AND METHOD" filed on Jan. 2, 2013, the entire contents of which are herein incorporated by reference for all purposes.

The present application is also related to U.S. Non-Provisional application Ser. No. 14/146,655 titled "TOKENIZATION AND THIRD-PARTY INTERACTION" filed Jan. 2, 2014, the contents of which are herein incorporated by reference for all purposes.

BACKGROUND

Traditional payment transactions are generally conducted between a merchant, payment processing network and issuer. If the merchant wants to apply a discount to the transaction, the merchant typically applies the discount prior to submitting an authorization request.

However, the increase in the number of electronic discounting mechanisms and centralized wallet servers have created problems with conducting payments and discounts in real time. Conventional systems may provide discounts sequentially thereby making the application of such discounts burdensome.

A technical problem to be solved therefore relates to how to successfully integrate and process transactions involving different payment systems and protocols.

Embodiments of the invention address this and other problems, individually and collectively.

SUMMARY

Embodiments of the invention relate to third-party authorizations and settlements.

According to some embodiments, a system and method may keep track of settlement with both a third-party (e.g., digital wallet provider, coupon or discount provider, shipping provider, etc.) and a payment card issuer. The system and method may send a comprehensive settlement to the acquirer. The system and method operate by receiving a settlement request (e.g., a clearing message) with a transaction identifier from an acquirer. A payment processor may split the request into two separate settlement requests, one sent to the third-party and the other to the issuer, both having unique transaction identifiers that are derived from the original transaction identifier. As a result of the system, acquirers and payment processors can better consolidate information and ensure that a payment is entirely settled when there are multiple paying entities involved in the transaction.

One embodiment of the invention is directed to a method for clearing and settling a transaction. The method includes receiving, at a server computer, a first clearing request message from a merchant computer, wherein the first clearing request message comprises a transaction identifier and a first transaction amount. The method also includes generating, via the server computer, a second clearing request message and transmitting the second clearing request message to a first computer, the second clearing request message comprising a first derived transaction identifier derived from the transaction identifier. The method further includes generating, via the server computer, a third clearing request message and transmitting the third clearing request message to a second computer, the third clearing request message comprising a second derived transaction identifier derived from the transaction identifier.

Another embodiment of the invention is directed to a server computer comprising a processor, and a computer readable medium coupled to the processor. The computer readable medium comprises code, executable by the processor, for implementing the above-described method.

These and other embodiments of the invention are described in further detail below with reference to the Figures and the Detailed Description.

DETAILED DESCRIPTION

Figure 1:
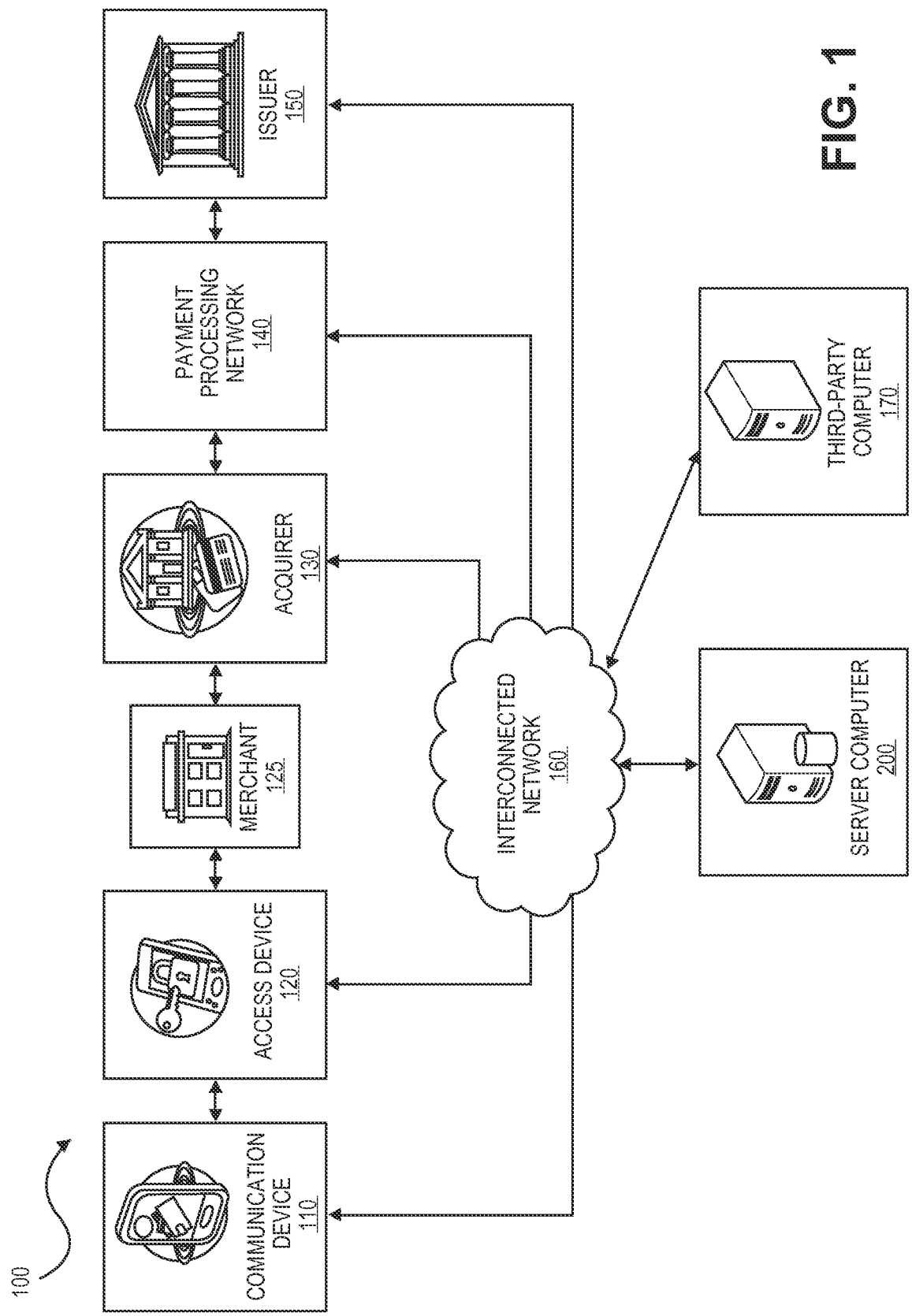
FIG. 1 is a block diagram of a payment system, according to an embodiment of the present invention.

Prior to discussing the specific embodiments of the invention, a further description of some terms can be provided for a better understanding of embodiments of the invention.

A "payment device" may include any suitable device capable of making a payment transaction. For example, a payment device can include a card such as a credit card, debit card, charge card, gift card, or any combination thereof. As another example, a payment device can be a communication device that is used to conduct a payment transaction.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

A "server computer" can be a powerful computer or a cluster of computers. For example, the server computer can be a large mainframe, a minicomputer cluster, or a group of servers functioning as a unit. In one example, the server computer may be a database server coupled to a Web server.

An "access device" can be any suitable device configured to process payment transactions. For example, an access device (e.g., a point-of-sale (POS) terminal, etc.) can be used to process payment transactions such as credit card or debit card transactions, or electronic settlement transactions, and may have optical, electrical, or magnetic readers for reading data from other portable communication devices such as smart cards, keychain device, cell phones, payment cards, security cards, access cards, and the like.

An "acquirer" is a business entity (e.g., a commercial bank) that typically has a business relationship with a merchant. An acquirer may receive some or all of the transactions from that merchant.

An "issuer" is a business entity which issues a payment account that can be used to conduct transactions. Typically, an issuer is a financial institution.

An "account holder" is user who is authorized to conduct transactions with a payment account. The account holder can be, for example, the account owner of the account associated with a payment device, or an individual who is authorized to use the account on behalf of the account owner. The terms "account holder" and "user" may be used interchangeably in the following description.

A "communication device," as described herein, can be any electronic communication device that can execute and/or support electronic communications including, but not limited to, payment transactions. Some examples include a personal digital assistant (PDA), a smart phone, tablet computer, notebook computer, and the like.

An "authorization request message" may be an electronic message that is sent to request authorization for a transaction. An authorization request message can be sent, for example, to a payment processing network and/or an issuer of a payment device. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. An authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an issuer bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, a "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a secure socket layer (SSL) session. However, any method of creating a secure channel may be used. By establishing a secure channel, sensitive information related to a payment device (such as account numbers, CVV values, expiration dates, etc.) may be securely transmitted between the two or more entities to facilitate a transaction.

A "digital wallet provider" may include any suitable entity that provides a digital wallet service. A digital wallet provider may provide software applications that store account numbers, or representations of the account numbers (e.g., tokens), on behalf of an account holder to facilitate payments at more than one unrelated merchant, perform person-to-person payments, or load financial value into the digital wallet.

A "token" may include a substitute for an account identifier such as a primary account number. Tokens are used in lieu of the primary account number and can be used to generate original and subsequent transactions for an entire transaction lifecycle. A token may be in a format that is similar to a primary account number. For example, if a real primary account number has 16 digits, then a corresponding payment token may also have 16 digits. In some, embodiments, a token may also be in a different format than a primary account number. A token may also be referred to as a "temporary credential."

An "offer" or a "discount" may include any incentive or reward from a third-party, such as a merchant, issuer, digital wallet provider, payment service provider, shipping provider, or other entity associated with a transaction. The offer or discount may apply to a particular transaction based on the specifics of the transaction and/or the account being used in the transaction. An offer or discount may also be referred to as a coupon.

A "clearing request message" may be an electronic message that is sent to request clearing and/or settlement for a transaction. A clearing request message can be sent, for example, to a payment processing network and/or an issuer of a payment device. The clearing request message may include a merchant or acquirer identifier that may be associated with a merchant or acquirer for the transaction. Additionally, the clearing request message may include a transaction identifier that identifies the transaction for which clearing and/or settlement is being requested. The clearing request message may precede settlement of funds between various parties involved in the transaction.

A "clearing response message" may be an electronic message that is sent in response to the clearing request message. The clearing response message may be generated by various parties involved in the transaction (e.g., issuer, coupon provider, shipping provider, etc.) The clearing response message may be received by a payment processing network, and/or an acquirer bank associated with the merchant, and/or the merchant. It should be noted that in some embodiments, the clearing and settlement process can be performed without a clearing response message. In other words, in some embodiments, the system may omit the generation and sending of a clearing response message.

I. EXEMPLARY SYSTEMS

Embodiments of the invention are directed to clearing and settlement systems with third party systems.

FIG. 1 is a block diagram of a payment system 100, according to one embodiment of the present invention. The system 100 includes a communication device 110, an access device 120, a merchant 125, an acquirer 130, a payment processing network 140, an issuer 150, and an interconnected network 160. The acquirer 130 may further include an acquirer computer (not shown). The payment processing network 140 may include an authorization and settlement server and/or additional servers (not shown) to carry out the various transactions described herein.

In an embodiment, a payment device such as communication device 110 is in electronic communication with the access device 120. The communication device 110 can be a personal digital assistant (PDA), a smart phone, tablet computer, notebook computer, or the like, that can execute and/or support payment transactions with a payment system 100. A communication device 110 can be used in conjunction with or in place of a payment card, such as a credit card, debit card, charge card, gift card, or other payment device and/or any combination thereof. For ease of explanation, a payment card (e.g., credit card), communication device 110 (e.g., smart phone), or a combination of both can be referred to as the communication device 110 hereinafter. In other embodiments, the communication device 110 may be used in conjunction with transactions of currency or points (e.g., points accumulated in a particular software application). In further embodiments, the communication device 110 may be a wireless device, a contactless device, a magnetic device, or other type of payment device. In some embodiments, the communication device 110 includes software (e.g., application) and/or hardware to perform the various payment transactions.

The access device 120 is configured to be in electronic communication with the acquirer 130 via a merchant 125. In one embodiment, the access device 120 is a point-of-service (POS) device. Alternatively, the access device 120 can be any suitable device configured to process payment transactions such as credit card or debit card transactions, or electronic settlement transactions, and may have optical, electrical, or magnetic readers for reading data from portable electronic communication devices such as smart cards, keychain device, cell phones, payment cards, security cards, access cards, and the like. In some embodiments, the access device 120 is located at and controlled by a merchant. For example, the access device 120 can be a POS device at a grocery store checkout line. In other embodiments, the terminal could be a client computer or a mobile phone in the event that the user is conducting a remote transaction.

The acquirer 130 (e.g., acquirer bank) includes an acquirer computer (not shown). The acquirer computer can be configured to transfer data (e.g., bank identification number (BIN), etc.) and financial information to the payment processing network 140. In some embodiments, the acquirer 130 does not need to be present in the system 100 for the communication device 110 to transfer the financial and user data to the payment processing network 140. In one non-limiting example, the acquiring bank 130 can additionally check the credentials of the user against a watch list in order to prevent fraud and money laundering schemes, as would be appreciated by one of ordinary skill in the art.

In one embodiment, the payment processing network 140 is VisaNet™ where Visa internal processing (VIP) performs the various payment processing network 140 or multi-lateral switch functions described herein. The payment processing network 140 can include an authorization and settlement server (not shown). The authorization and settlement server ("authorization server") performs payment authorization functions. The authorization server is further configured to send and receive authorization data to the issuer 150. Furthermore, the payment processing network 140 can communicate with one or more third-parties to determine if an offer or discount is eligible for the transaction, as further described below.

In some embodiments, the issuer 150 is a business entity which issues a payment account that can be used to conduct transactions. Typically, an issuer is a financial institution. The issuer 150 is configured to receive the authorization data from the payment processing network 140 (e.g., the authorization server). The issuer 150 receives authentication data from the authorization server and determines if the user is authorized to perform a given financial transaction (e.g., cash deposit/withdrawal, money transfer, balance inquiry) based on whether the user was authenticated by an identification system.

In some embodiments, the communication device 110 may be connected to and communicate with the payment processing network 140 via an interconnected network 160. One example of an interconnected network 160 is the Internet. The payment processing network 140 may inform the communication device 110 when a payment has been successfully processed. In some embodiments, the payment processing network 140 may be connected to and communicate with the access device 120 via the interconnected network 160. The payment processing network 140 may inform the access device 120 when a payment has been successfully processed which in turn the access device 120 may complete the transaction with the communication device 110.

A server computer 200 is also shown in FIG. 1, and is in operative communication with the interconnected network 160. Details regarding the server computer 200 are provided below. In some embodiments, the server computer 200 may be a part of the payment processing network 140.

Additionally, a third-party computer 170 is shown in FIG. 1, and is also in operative communication with the interconnected network 160. The third-party computer may be part of any third-party network that is involved with a payment transaction carried about by the payment system 100. Examples of the third-parties that can employ the third-party computer include, but are not limited to, digital wallet providers, coupon providers, additional issuer or acquirer banks, shipping providers, etc. Although FIG. 1 is shown with one third-party computer 170, in some embodiments, more than one third-party computers can be involved in a transaction. For example, in some transactions, a third-party computer associated with a coupon provider and another third-party computer associated with a shipping provider may participate in the processing of a transaction.

The interconnected network 160 may comprise one or more of a local area network, a wide area network, a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks.

In a payment transaction according to embodiments of the invention, a user may interact with the access device 120 (e.g., with a payment device such as a payment card or communications device, or by entering payment information) to conduct a transaction with the merchant 125. The merchant 125 may be operated by a merchant computer, which may route an authorization request message to the acquirer 130, and eventually to the issuer 150 via the payment processing network 140. In other embodiments, the user may simply interact with the communication device 110 to conduct a transaction with the merchant 125, e.g., online purchases.

The issuer 150 will then determine if the transaction is authorized (e.g., by checking for fraud and/or sufficient funds or credit). The issuer will then transmit an authorization response message to the access device 120 via the payment processing network 140 and the acquirer 130.

At the end of the day, the transaction is cleared and settled between the acquirer 130 and the issuer 150 by the payment processing network 140. The transaction may also be cleared and settled between the acquirer 130, the issuer 150, and one or more third-party computers 170, using the methods described below.

The description below provides descriptions of other components in the system as well as transactions involving third-parties. Interactions with the third-parties can be performed at any suitable point during the above-described transaction flow. For example, the payment processing network 140 may communicate with one or more third-parties to determine whether any offers or discounts are eligible towards the transaction. In some embodiments, the offer or discount may be used to reduce the total cost of the transaction to the consumer, and may be in the form of an amount off the price of a good or service, a percentage off the price of a good or service, a free shipping offer, a tax incentive, etc.

Figure 2:
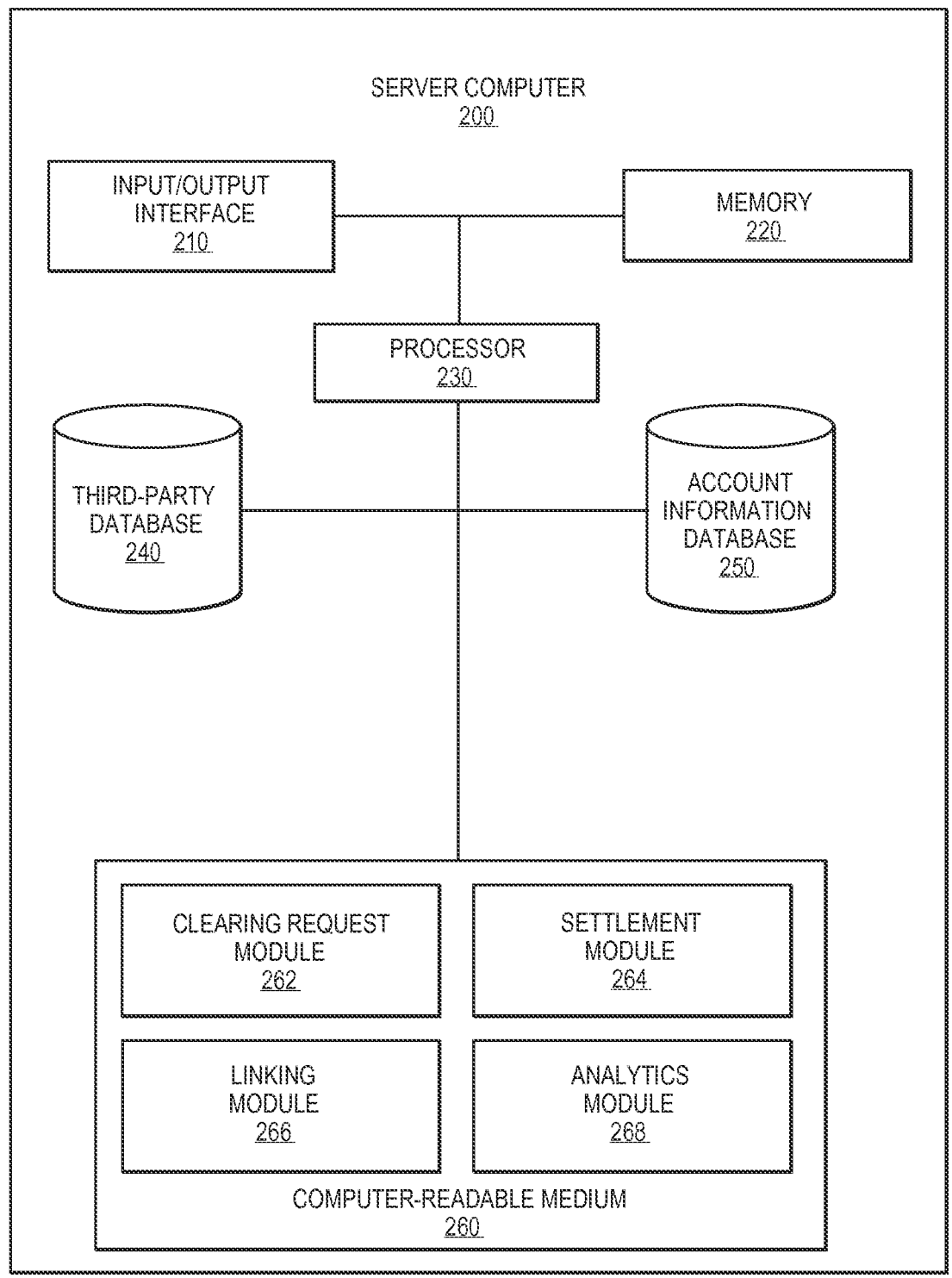
FIG. 2 is a block diagram of a server computer, according to an embodiment of the present invention.

FIG. 2 is a block diagram of a server computer 200, according to an embodiment of the present invention. Server computer 200 includes an input/output interface 210, a memory 220, a processor 230, a third-party database 240, an account information database 250, and a computer-readable medium 260. In some embodiments, the server computer may reside within the interconnected network 160 (FIG. 1). In other embodiments, the server computer may reside within the payment processor network 140 (FIG. 1).

The input/output (I/O) interface 210 is configured to receive and transmit data. For example, the I/O interface 210 may receive an authorization request message from the acquirer 130 (FIG. 1). The I/O interface 210 may also communicate with one or more third-parties during the clearing and settlement stages of the payment transaction. The I/O interface 210 may also be used for direct interaction with the server computer 200. The I/O interface 210 may accept input from an input device such as, but not limited to, a keyboard, keypad, or mouse. Further, the I/O interface 210 may display output on a display device.

Memory 220 may be any magnetic, electronic, or optical memory. It can be appreciated that memory 220 may include any number of memory modules, that may comprise any suitable volatile or non-volatile memory devices. An example of memory 220 may be dynamic random access memory (DRAM).

Processor 230 may be any general-purpose processor operable to carry out instructions on the server computer 200. The processor 230 is coupled to other units of the server computer 200 including input/output interface 210, memory 220, offers database 240, account information database 250, and computer-readable medium 260.

Third-party database 240 is configured to store information about one or more third-parties that may be involved in a payment transaction. The information about the third-parties may be stored within the third-party database 240 prior to a transaction taking place. The server computer 200 may communicate, via I/O interface 210, with one or more third-parties during the clearing and settlement phases, as described in further detail below. The information stored within the third-party database 240 may be used to determine how to communicate with the third-party. For example, the third-party database may include information about specific communication protocol employed by the third-party computer, allowing the server computer 200 to properly communicate with the third-party computer. Additionally, the third-party database 240 could include information about which third-parties have been involved with particular payment transaction, such that when it is time for the clearing and settling stages the appropriate third-party can be sent clearing and settlement messages.

The account information database 250 is configured to store information about payment accounts. This information can include personal information, e.g., name, age, birthdate, gender, etc. of the account owner or account holder. The information can also include the primary account number (PAN) associated with a user's payment device. The information stored in the account information database may be used, by the server computer 200, in conjunction with the third-party database 240 when during the clearing and settlement stages of a payment transaction. The account information database 250 may also include information about any tokens or temporary credentials associated with payment accounts.

Computer-readable medium 260 may be any magnetic, electronic, optical, or other computer-readable storage medium. Computer-readable storage medium 260 includes token replacement module 262, offer determination module 264, and real time messaging module 268. Computer-readable storage medium 260 may comprise any combination of volatile and/or non-volatile memory such as, for example, buffer memory, RAM, DRAM, ROM, flash, or any other suitable memory device, alone or in combination with other data storage devices.

Clearing request module 262 is configured to facilitate the clearing stage of a payment transaction. The clearing request module 262 can receive a clearing request message from an acquirer 130 (FIG. 1) that includes a transaction identifier and a transaction amount. In some embodiments, the clearing request message can be combined with an authorization request, and the clearing request message may include both authorization and clearing information. The clearing request module 262 may split the received clearing request message into one or more separate clearing requests messages. In some embodiments, the received clearing request message can be split into a separate clearing request messages for each party involved in the payment transaction (e.g., issuer, digital wallet provider, shipping provider, etc.). Each of the split clearing request messages may include a transaction identifier that is derived from the original transaction identifier in the received clearing request message. Additionally, each of the received clearing request messages may include a portion of the original transaction amount in the transaction amount field. For example, if the original transaction amount in the received clearing request message is $100, one of the split clearing request messages may have a $5 transaction amount and another split clearing request message may have a $95 transaction amount, depending on each parties' financial contribution toward the payment transaction. The clearing request module 262 may also forward each generated clearing request message to the appropriate party. In some embodiments (e.g., where the clearing request message includes both authorization and clearing information), the clearing request module 262 may receive a clearing request response from each of the parties, including the parties' respective transaction amounts. Each of the received clearing request messages may also include the derived transaction identifier from the original transaction identifier. After receiving the clearing request responses from each of the parties, the clearing request module 262 may send the acquirer 130 (FIG. 1) a single clearing response message that includes the original transaction amount and original transaction ID. In some embodiments (e.g., where authorization for a transaction is performed before initiation of the clearing and settlement process), the sending of the clearing response messages can be omitted. For example, the clearing request module 262 may receive a single clearing message from the acquirer 130 (FIG. 1) for the full amount of the transaction (e.g., $100) expecting that the full amount will be settled. The server computer 200 may then split the full transaction amount into separate transaction amounts when settling with the respective parties (e.g., $95 from the issuer and $5 from the third-party) without sending any clearing response messages.

Settlement module 264 is configured to facilitate settling of the payment transaction after the clearing request module 262 facilitates the clearing stage. After the clearing stage has completed and the various parties involved in the transaction have indicated approval of their respective transaction amounts in the clearing response messages received by the server computer 200, the settlement module 264 may settle with each of the parties for the approved transaction amount. For example, the settlement module 264 may settle with an issuer for $95 and a coupon provider for $5 for a transaction having an original transaction amount of $100.

Linking module 266 is configured to link the split clearing request messages generated by the clearing request module 262 to the original clearing request message. Additionally, linking module 266 is configured to link the individual received clearing responses messages from the one or more parties involved in the transaction to the final clearing response message sent by the server computer 200 to the acquirer 130 (FIG. 1). In other embodiments, a clearing response message to the acquirer 130 (FIG. 1) is not necessary, and server computer 200 may simply settle the appropriate amount with the acquirer 130 (FIG. 1). This process is described in further detail below. The linking module 266 enables the tracking of transaction identifiers and tracking transactions to ensure that they are adequately cleared and settled. The linking module may keep track of the original transaction identifier included in the received clearing request message and link them to the derived transaction identifiers included in the split clearing request messages. Additionally, the linking module 266 may link the various clearing messages to an authorization request message that was originally used to approve the transaction that is being settled and cleared. Additionally, by linking the various messages together, the linking module 266 may determine duplicate authorization messages and ensure that an authorization is not accidently approved more than once.

Analysis module 268 is configured to perform various analytics on one or more payment transactions carried out via payment system 100. The analytics may be performed using the various the settlement messages. For example, by linking and tracking the various messages together, the analysis module 268 may keep track of which message responses were received within an adequate period of time and which third-parties involved in the transaction settle their respective transaction amounts appropriately. The analytics may be used to favor certain third-parties over others based on prior transaction history. For example, if a first coupon provider provides more timely settlement clearing and settlement than a second coupon provider, the payment system 100 may prioritize offers from the first coupon provider over the second coupon provider.

It can be appreciated that in some embodiments the server computer 200 may reside within the payment processing network 140 (FIG. 1).

II. AUTHORIZATION, CLEARING, AND SETTLEMENT

Figure 3:
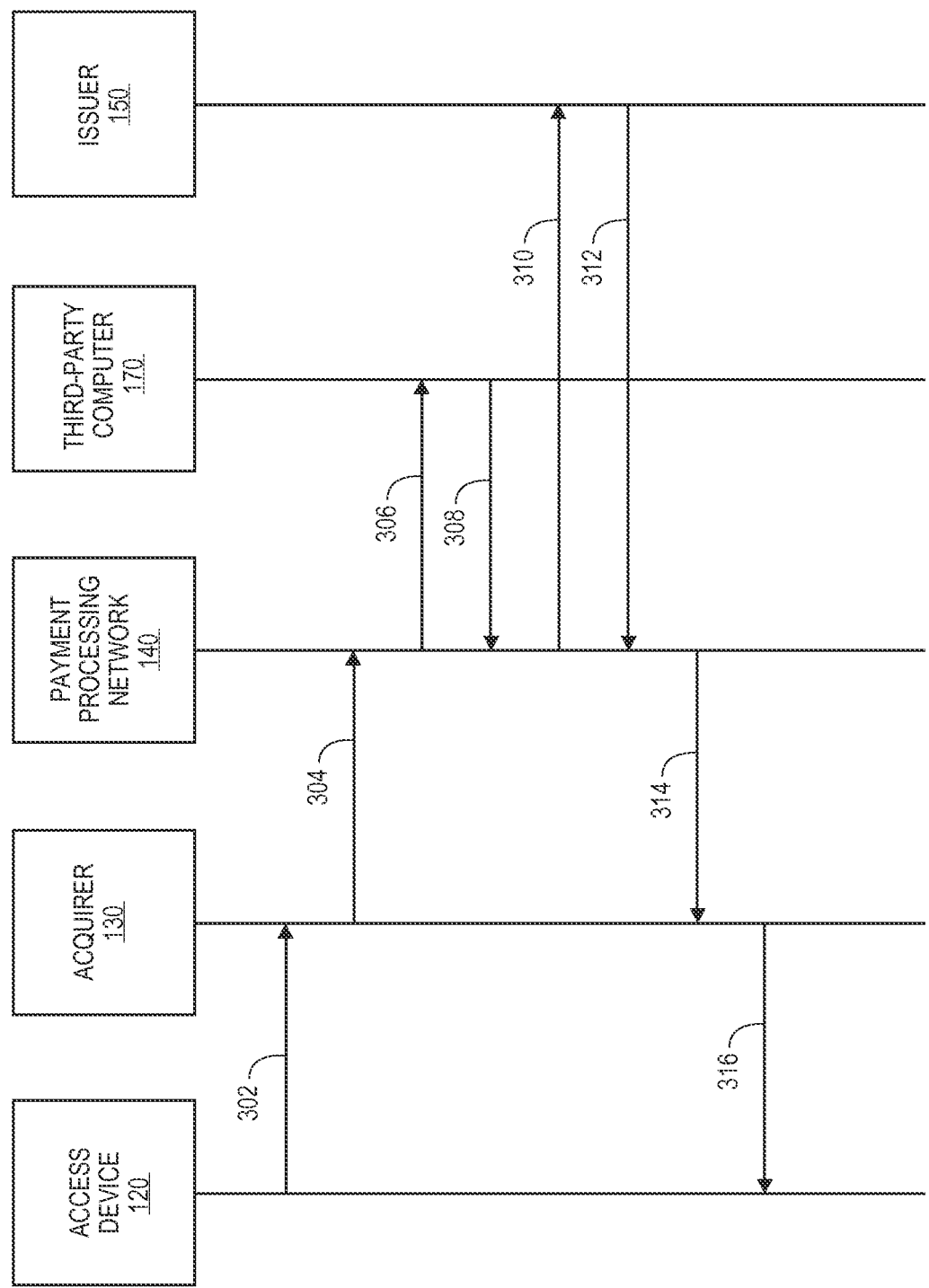
FIG. 3 shows a flow diagram illustrating an authorization method, according to an embodiment of the invention.

FIG. 3 shows an authorization process according to an embodiment of the invention. The process in FIG. 3 can also be described with reference to FIG. 1, along with an exemplary transaction whereby a consumer using a communication device 110 (FIG. 1) (e.g., mobile device) conducts a transaction. In the exemplary transaction, the consumer may wish to purchase a good at a merchant for $100 using a payment account in a digital wallet maintained by the third-party computer 170. In this example, the third-party computer 170 may be operated by a digital wallet provider. The consumer may use the communication device 110 to interact with the access device 120 operated by the merchant 125 (FIG. 1). The communication device 110 and the access device 120 may interact through any suitable contact (e.g., using a magnetic stripe and a magnetic strip reader) or contactless mode of operation (e.g., using an RF ID transmitting element and an RFID reader). The third-party computer 170 may further store data relating to a coupon for $5 off of a transaction conducted at the merchant in the consumer's digital wallet.

Referring to FIG. 1, a consumer (not shown) may conduct a transaction at a merchant 125 (FIG. 1) operating an access device 120 and a merchant computer (not shown). Using the communication device 110, the consumer may select a payment account (e.g., a credit or debit account) that is maintained by the third-party computer 170. The third-party computer 170 may be operated by the payment processing network 140 or another entity that is independent of the payment processing network 140.

The consumer may then provide the account information to the access device 120. This can be done in any number of ways. For example, if the communication device 110 has a contactless element, it may pass the account information to the access device 120 through a contactless communication medium. For instance, the access device 120 may have an RFID type reader while the mobile device's contactless element may have a RFID transmitter. In another example, a barcode (e.g., a one dimensional or two dimensional barcode) or token (e.g., a psuedopan or pseudo primary account number) may be generated by the communication device 110 and this information may be obtained (e.g., through a camera) by the access device 120.

Once the access device 120 has the account information and the transaction information (e.g., at least one of the identifier for the good to be purchased, the transaction amount, the merchant identifier, etc.), the access device 120 may generate an authorization request message that is to be transmitted to the issuer computer 150.

Referring to FIGS. 1 and 3, the access device 120 may transmit the authorization request message to the acquirer computer 130 (step 302). The authorization request message may be a first authorization request message. The first authorization request message may comprise an account identifier for the account that is being used to pay for the purchase, a transaction identifier to identify the particular transaction, the purchase amount (e.g., transaction amount), an indication that a coupon is to be applied, a merchant ID, and other information. For example, the first authorization request message may comprise at least a primary account number (e.g., 4238 8738 5555 5827), an indicator that a $5 coupon is to be applied to the purchase, a merchant identifier, and a transaction amount of $100. In some embodiments, the $5 coupon may be offered from the third-party running the third-party computer 170. After receiving the authorization request message, the acquirer computer 130 may then transmit the authorization request message to the payment processing network 140 (step 304). It can be appreciated that the steps performed my payment processing network 140 may also be performed by server computer 200 (e.g., when server computer 200 is part of payment processing network 140).

After the payment processing network 140 receives the authorization request message, it may generate a second authorization request message that is transmitted to the third-party computer 170 (step 306), which may be an example of a first computer. The payment processing network 140 may then receive a first authorization response message from the third-party computer 170 (step 308). The second authorization request message and the authorization response message from the third-party computer 170 may include an adjusted transaction amount (e.g., $5 if the third-party computer 170 is a coupon provider). The payment processing network 140 may also generate and transmit a third authorization request message to the issuer 150 (step 310), which may be an example of a second computer. The third-party computer 170 may then receive a second authorization response message from issuer 150 (step 312). The third authorization request message and the authorization response message from the issuer 150 may include an adjusted transaction amount. In some embodiments, instead of generating a second authorization request message, the payment processing network 140 may request authorization from the third-party computer 170 using a different type of method, e.g., invoking an application programming interface (API), using a web service, etc.

In the previous illustration, the payment processing network 140 (or server computer 200 therein) may generate and transmit a second authorization request message to the third-party computer 170 comprising either the total transaction information (e.g., $100 purchase price, $5 coupon indicator, merchant ID, and account identifier) or just information about the discount to be applied ($5 coupon indicator). The first and second authorization response messages may comprise indications that the discount and/or the transaction amount are approved. Before, after, or simultaneously with the transmission of the second authorization request message, the third authorization request message may comprise the discounted transaction amount (e.g., $95.00) and may request that the transaction be approved by the issuer computer 150 for that amount.

In some embodiments, the payment processing network 140 may transmit an authorization request message including the total transaction amount to the third-party computer 170. The third-party computer 170 may respond to the authorization request message with an authorization response message including the total transaction amount less the discount (e.g., the authorization request message may include a $100 transaction amount and the authorization response message may include a $95 transaction amount).

After the payment processing network 140 receives the first and second authorization response messages, a third authorization response message may be generated and sent to the acquirer computer 130 and then to the access device 120 (steps 314, 316), thereby informing the consumer and the merchant that the transaction, along with the discount are approved.

Further details of the process described with respect to FIG. 3 may be found in U.S. Non-Provisional application Ser. No. 14/146,655 titled "TOKENIZATION AND THIRD-PARTY INTERACTION" filed Jan. 2, 2014.

Figure 4:
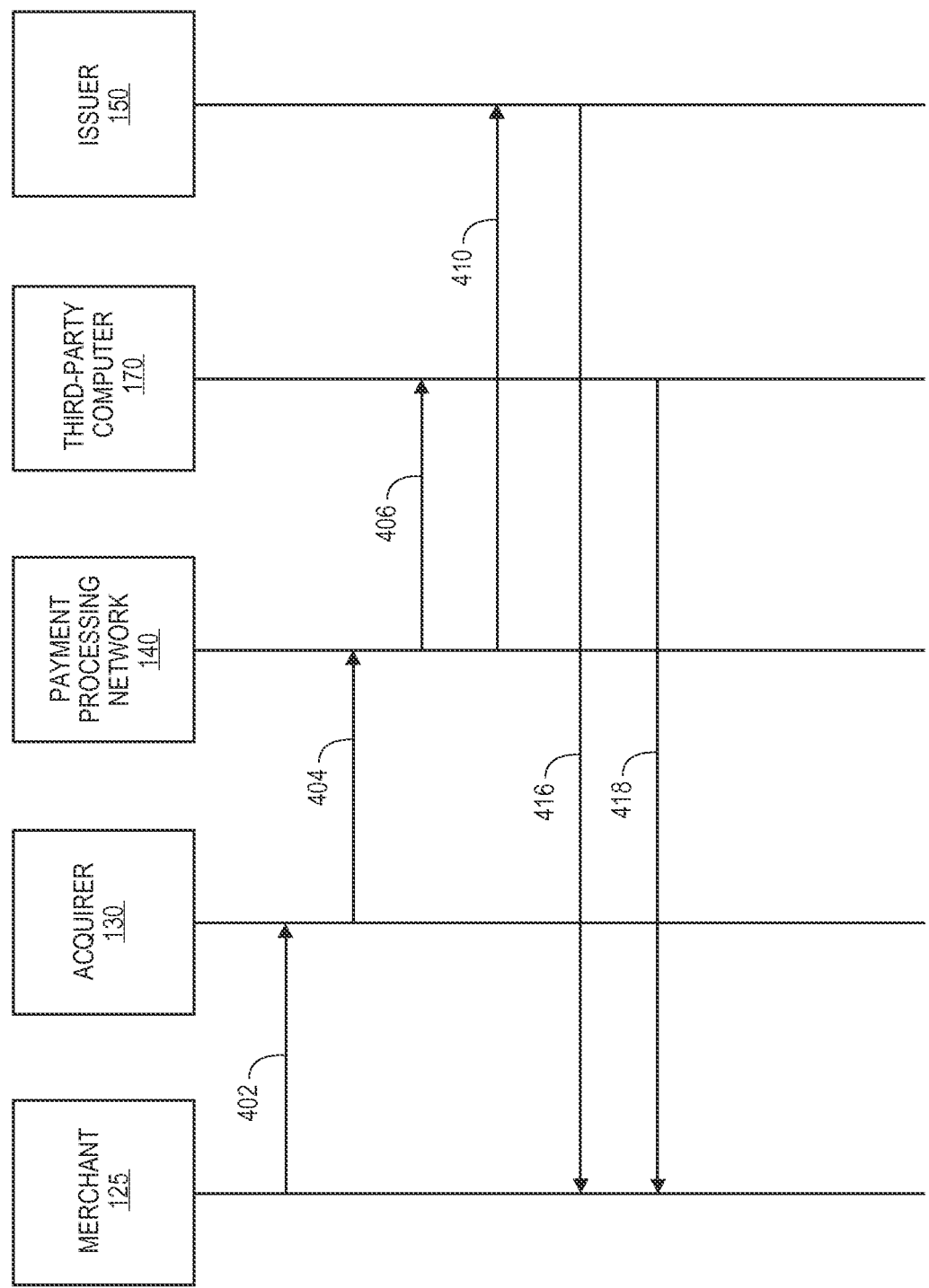
FIG. 4 shows a flow diagram illustrating a clearing process, according to an embodiment of the invention.

FIG. 4 shows a flow diagram illustrating a clearing and settlement process according to an embodiment of the invention. Referring to FIG. 4, in some embodiments, at a later point in time, the merchant 125 may obtain any authorization information from the access device 120 and other access devices that it may operate. The merchant 125 may provide some or all of this information to the acquirer computer 130 (step 402). In other embodiments, the merchant need not be involved in the clearing and settlement process and the acquirer computer 130 may have access to the information necessary to begin the clearing and settlement process. Acquirer computer 130 may generate and transmit a first clearance request message to the payment processing network 140 (step 404). The first clearing request message may comprise a transaction ID to identify the transaction being cleared and settled, and a transaction amount. The transaction amount may be for the full amount of the transaction (e.g., sans any discount). In some embodiments, the clearing request process can be performed with the authorization process. In such embodiments, the clearing request message may include both authorization and clearing information.

Once received at the payment processing network 140, the payment processing network 140 may then generate a second clearing request message that contains the amount that is to be sent from the third-party computer 170 to the merchant (e.g., the $5 coupon provided by the third-party computer). The second clearing request message may comprise a first derived transaction ID that is derived from or related to the transaction ID. For example, if the original transaction ID is 111222333, then the first derived transaction ID may be 111222333'.

The payment processing network 140 may then generate a third clearing request message that contains the amount that is to be sent from the issuer 150 to the merchant 125. The third clearing request message may comprise a second derived transaction ID that is derived from the transaction ID. It can be appreciated that the second derived transaction ID may be different from the first derived transaction ID. For example, if the original transaction ID is 111222333, then the second derived transaction ID may be 111222333".

Other derivation mechanisms or relationships between the original transaction ID and the first and second transaction IDs are possible and are within embodiments of the invention. The derived transaction IDs make it possible to link the different clearance messages to the original transaction, since multiple parties need to pay the merchant for a single transaction.

After generating the first derived transaction ID and the second derived transaction ID, the payment processing network may transmit a second clearing request message and a third clearing request message to the third-party computer 170 and the issuer 150 (steps 406, 410). The second clearing request message may include the first derived transaction identifier and a first adjusted transaction amount. For example, the second clearing request message may be sent to the third-party computer 170 and may include a transaction ID of 111222333' and a transaction amount of $5, as the third-party computer 170 may be a coupon provider. The third clearing request message may be sent to the issuer 150 and may include a transaction ID of 111222333" and a transaction amount of $95, the original transaction amount less the discount amount.

In some embodiments (e.g., where the clearing request messages include both authorization and clearing information), the issuer 150 and the third-party computer 170 may transmit first and second transaction clearing response messages (steps 416, 418) to the payment processing network 140, acquirer computer 130, and/or the merchant computer 125. The first and second clearing response messages may indicate that clearing is approved by the third-party computer 170 and the issuer 150 for the respective transaction amounts (e.g., $5 for the third-party computer 170 and $95 for the issuer 150). The first clearing response message may include the transaction ID of the second clearing request message and the second clearing response message may include the transaction ID of the third clearing request message (e.g., 111222333' and 111222333"). In some embodiments, the first clearing response message and the second clearing response message may be received by the payment processing network 140. The payment processing network 140 may then combine the first and second clearing response messages into a single response message and transmit it to the acquirer 130 and/or the merchant 125. The single response message may include the original transaction ID (e.g., 111222333) and the original transaction amount (e.g., $100). In some embodiments (e.g., where the clearing process is performed subsequent to authorization), clearing response messages may not be required, and server computer 200 may simply settle the appropriate amount with the acquirer 130 (FIG. 1) without clearing response messages. This process is described in further detail below.

After the clearing messages are transmitted, settlement can occur at a later time (e.g., at the end of the day). At that time, the net settlement positions of the various issuers, acquirers, and any third parties can send money to other parties to satisfy their net settlement positions.

In some embodiments, the third-party computer 170 can be operated by a shipping provider. The shipping provider may offer a shipping discount on a transaction. At the time of clearing, the shipping provider may settle for an amount that effectively offsets any shipping charges incurred by the buyer. For example, the consumer may purchase a $95 item with a $5 shipping charge. The consumer may be presented with a $100 total transaction amount. At the time of clearing and settlement, the issuer 150 may settle for $95 and the third-party 170 (e.g., shipping provider) may settle for $5. Since the issuer only settles for $95, the consumer's account statement may only reflect a $95 charge.

It can be appreciated that in some embodiments, the clearing response messages in the process detailed in FIG. 4 may not be required. For example, the authorization request message and authorization response message may be transmitted and received by the appropriate parties as described above. After a transaction has been authorized, the process may be followed by a clearing request message that initiates the settlement process. The clearing request message may be a one-way communication generated by the acquirer 130. It can be appreciated that the clearing message may not have any counter-part response message. That is, the acquirer 130 may submit the clearing record with the clearing message and expect that the transaction amount will be credited to the acquirer 130.

In other embodiments, both authorization and clearing request information may be contained in the same message. That is, the acquirer 130 may generate a message including both authorization and clearing information. In such embodiments, the acquirer 130 may receive a response to this message including both authorization and clearing response information.

Figure 5:
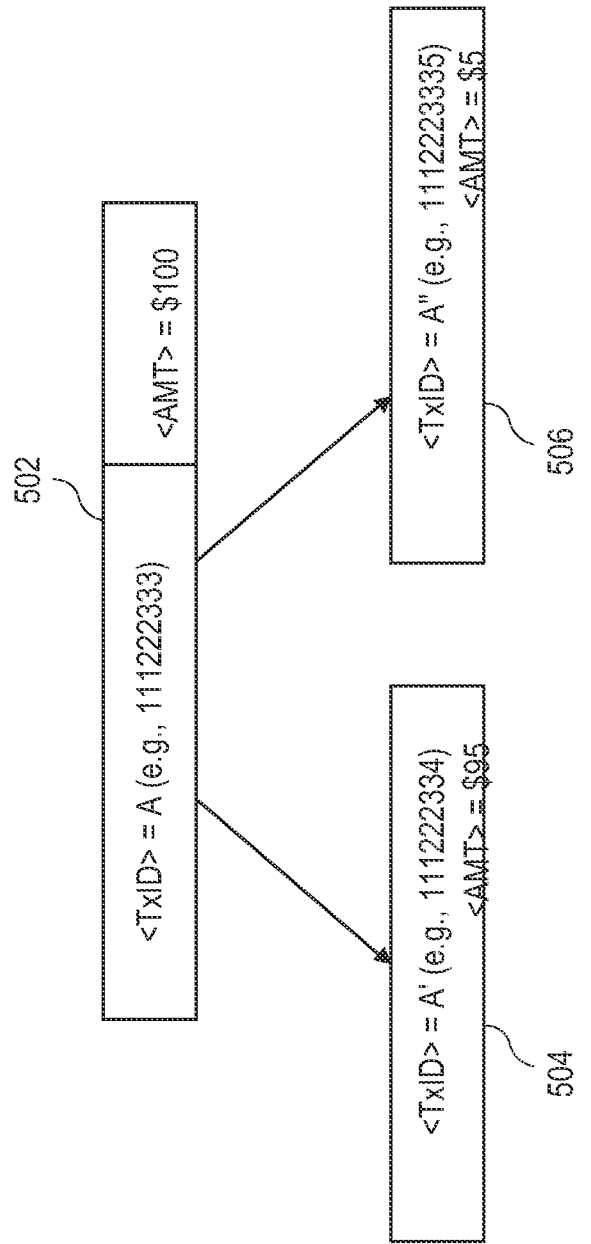
FIG. 5 illustrates splitting a clearing request message, according to an embodiment of the invention.

FIG. 5 illustrates splitting a clearing request message, according to an embodiment of the invention. As shown in FIG. 5, a first clearing request message 502 may include data fields for a transaction identifier (e.g., <TxID>=A) and a transaction amount (e.g., <AMT>=$100). The first clearing request message 502 may be received by the server computer 200 (FIG. 1) from the acquirer 130 (FIG. 1). Upon receiving the clearing request message from the acquirer 130 (FIG. 1), the server computer 200 (FIG. 1) may "split" the first clearing request message 502 into a second clearing request message 504 and a third clearing request message 506. The second clearing request message 504 and the third clearing request message 506 may each include a unique transaction identifier derived from the original transaction identifier. For example, the second clearing request message 504 may include a transaction identifier as follows: <TxID>=A'. The third clearing request message 506 may include a transaction identifier as follows: <TxID>=A". In both cases, the unique transaction identifiers are derived from the original transaction identifier. It can be appreciated that unique transaction identifier may be generated using any derivation of the original transaction identifier, e.g., appending any alphanumeric character to the end (or beginning) of the transaction identifier.

In some embodiments, the derived transaction identifiers may be derived using a function, and applying the function to the original transaction identifier, e.g., by using an algorithm. For example, the derived transaction identifier can be derived by adding or subtracting a number to or from the original transaction identifier. In some embodiments, the number being added or subtracted can be based on the intended recipient of the generated clearing request message. For example, if the generated clearing request message is to be received by a coupon provider, the derived transaction identifier included in the clearing request message can be generated by adding 2 to the original transaction identifier; whereas if the generated clearing request message is to be received by a shipping provider, the derived transaction identifier can be generated by subtracting 1 from the original transaction identifier. In some embodiments, the derived transaction identifier included in the clearing request message can be generated by prepending, appending, or otherwise inserting a sequence of one or more numeric or alphanumeric characters into the original transaction identifier (e.g., between characters of the original transaction identifier). In some embodiments, the derived transaction identifier can be generated by replacing or removing one or more characters in the original transaction identifier. In yet other embodiments, the unique transaction identifiers may be derived by splitting the original transaction identifier, e.g., the first half the original transaction identifier may be used as the first derived transaction identifier and the second half of the original transaction identifier may be used as the second derived transaction identifier. It can be appreciated that the unique transaction identifiers may be derived using any other method, including combinations of any of the above.

Additionally, the second clearing request message 504 and the third clearing request message 506 each include an adjusted transaction amount. For example, the second clearing request message 504 may include a $95 transaction amount (e.g., <AMT>=$95) and the third clearing request message 506 may include a $5 transaction amount (e.g., <AMT>=$5). The adjusted amounts may reflect a contribution amount during settlement from each party to a transaction. For example, the $95 could be contributed by an issuer 150 (FIG. 1) and the $5 could be contributed by a third-party 170 (FIG. 1), such as a coupon provider.

In some embodiments, the derived transaction identifiers may each include an indicator indicating that the respective derived transaction identifier was derived from a transaction identifier such that a recipient of the derived transaction identifier can recognize the received transaction identifier was derived from another transaction identifier. For example, the indicator can be a sequence of one or more numeric or alphanumeric characters prepended, appended, or otherwise inserted into the original transaction identifier (e.g., between characters of the original transaction identifier) to generate the derived transaction identifier. As an example if the original transaction identifier is 111222333, the derived transaction identifiers may be 551112223331 and 551112223332, where the characters "55" is used as an indicator that the transaction identifier is a derived transaction identifier. In some embodiments, for example, where the number of characters available for the derived transaction identifier is limited, the indicator can replace one or more characters of the original transaction identifier.

The derived transaction identifiers may allow for linking and tracking of the split clearing request messages (e.g., second clearing request message 504 and third clearing request message 506) to the first clearing request message 502. Upon receiving clearing response message from appropriate parties, the server computer 200 (FIG. 1) may use the derived transaction identifiers to identify the original transaction for which the clearing response messages were received. Additionally, the server computer 200 may combine the received clearing response messages into a final clearing response message transmitted to the acquirer 130 (FIG. 1) and/or the merchant 125 (FIG. 1).

III. EXEMPLARY METHODS

Figure 6:
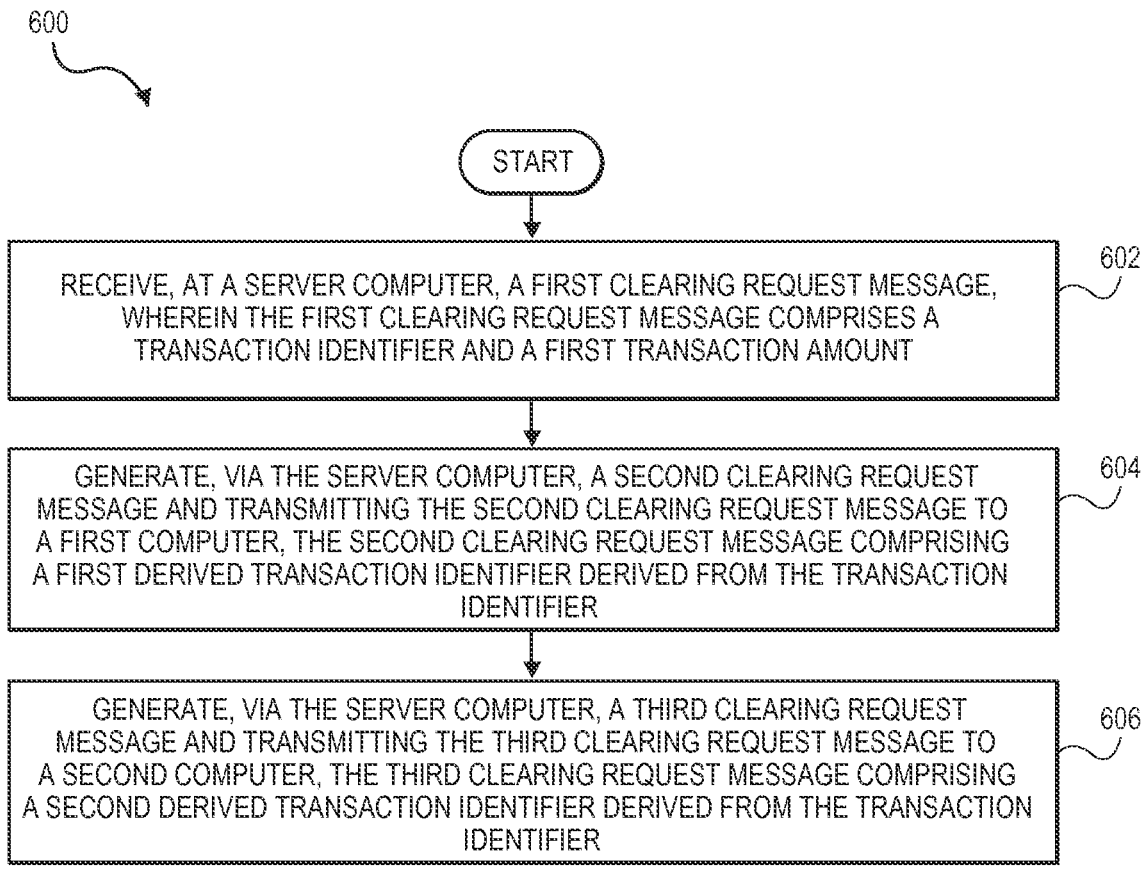
FIG. 6 shows a flow diagram illustrating an exemplary method for clearing a transaction, according to an embodiment of the invention.

FIG. 6 is a flow diagram illustrating a method 600 for clearing a transaction, according to an embodiment of the present invention. The method 600 is performed by processing logic that may comprise hardware (circuitry, dedicated logic, etc.), software (such as is run on a general purpose computing system or a dedicated machine), firmware (embedded software), or any combination thereof. In certain embodiments, the method 600 is performed by the server computer 200 or the payment processing network 140 of FIG. 1.

The method 600 may begin when a user initiates a financial transaction using his or her payment device. Alternatively, the user may initiate the financial transaction at an access device. After the financial transaction has been authorized, the server computer may receive, via a first communication channel, a first clearing request message from an acquirer, where the first clearing request message comprises a transaction identifier and a first transaction amount (Step 602). The first clearing request message may be a request to clear and settle the transaction that had previously been authorized.

After receiving the first clearing request message, the server computer may generate a second clearing request message and transmit the second clearing request message to a first computer, the second clearing request message comprising a first derived transaction identifier derived from the transaction identifier (Step 604).

Simultaneously, before, or after generating and transmitting the second clearing request message, the server computer may generate a third clearing request message and transmit the third clearing request message to a second computer, the third clearing request message comprising a second derived transaction identifier derived from the transaction identifier (Step 606).

In some embodiments, the first computer can be associated with an issuer who is responsible for settling with the acquirer, and the second computer can be associated with a third-party.

In some embodiments, the second clearing request message comprises a second transaction amount and the third clearing request message comprises a third transaction amount. For example, the second transaction amount may be an amount of a discount or offer offered by a third-party coupon provider (e.g., $5). The second transaction amount could also be a shipping amount offered by a shipping company. The third transaction amount may be the original transaction amount less the second transaction amount (e.g., the discount). The third transaction amount could also be an amount that is a function of the original transaction amount and the second transaction amount.

In some embodiments, the method includes settling the second transaction amount with the first computer and settling the third transaction amount with the second computer.

In some embodiments, the second transaction amount can be associated with an offer from a third-party.

In some embodiments, the second transaction amount can be associated with a shipping charge for the transaction.

In some embodiments, the server computer generates a fourth clearing request message and transmits the fourth clearing request message to a third computer, the fourth clearing request message including a third derived transaction identifier derived from the transaction identifier and a fourth transaction amount. The second transaction amount may be associated with an offer from a third-party (e.g., a first coupon provider), and the third transaction amount may be associated with a shipping charge for the transaction. The fourth clearing request message may be transmitted to another third-party involved in the transaction (e.g., a second coupon provider). The second coupon provider may provide a discount that could be combined with a discount from the first coupon provider (e.g., a non-exclusive offer). The fourth transaction amount may be an amount for the discount offered by the second coupon provider.

In some embodiments, the method includes receiving, at the server computer, a first clearing response message in response to the second clearing request message. The server computer may also receive a second clearing response message in response to the third clearing request message. The server computer may then send a third clearing response message to an acquirer, wherein the third clearing response message comprises the first transaction amount. In other embodiments, the clearing response message may be optional, and server computer 200 may omit sending a clearing a response message to the acquirer and may simply settle the appropriate amount with the acquirer.

IV. EXEMPLARY SYSTEMS

Figure 7:
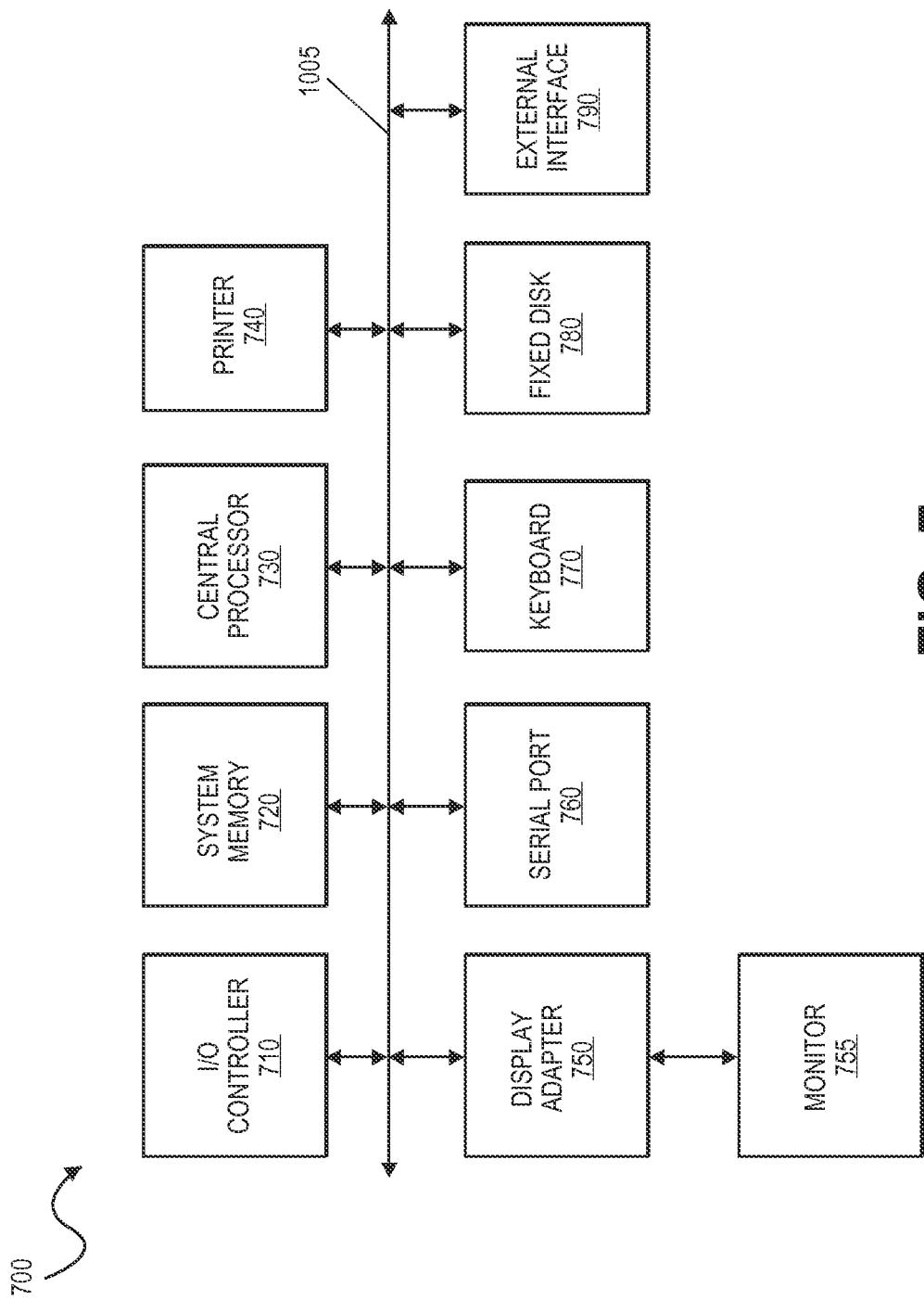
FIG. 7 is a block diagram of a computer apparatus, according to an example embodiment.

FIG. 7 is a diagram of a computer apparatus 700, according to an example embodiment. The various participants and elements in the previously described system diagram (e.g., the communication device, payment processing network, acquiring bank, issuing bank, server computer, etc., in FIG. 1) may use any suitable number of subsystems in the computer apparatus to facilitate the methods and/or functions described herein. Examples of such subsystems or components are shown in FIG. 7. The subsystems shown in FIG. 7 are interconnected via a system bus 705. Additional subsystems such as a printer 740, keyboard 770, fixed disk 780 (or other memory comprising computer-readable media), monitor 755, which is coupled to display adapter 750, and others are shown. Peripherals and input/output (I/O) devices (not shown), which couple to I/O controller 710, can be connected to the computer system by any number of means known in the art, such as serial port 760. For example, serial port 760 or external interface 790 can be used to connect the computer apparatus to a wide area network such as the Internet, a mouse input device, or a scanner. Alternatively, peripherals can be connected wirelessly (e.g., IR, Bluetooth, etc.). The interconnection via system bus allows the central processor 730 to communicate with each subsystem and to control the execution of instructions from system memory 720 or the fixed disk 780, as well as the exchange of information between subsystems. The system memory 720 and/or the fixed disk 780 (e.g., hard disk, solid state drive, etc.) may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

One or more embodiments of the invention may be combined with one or more other embodiments of the invention without departing from the spirit and scope of the invention.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A method for clearing a transaction, comprising:
   receiving, by a server computer, a first authorization request message comprising at least a transaction amount associated with the transaction;
   generating, by the server computer, a second authorization request message and transmitting the second authorization request message to a first computer, the second authorization request message comprising a first adjusted transaction amount;
   generating, by the server computer, a third authorization request message and transmitting the third authorization request message to a second computer, the third authorization request message comprising a second adjusted transaction amount;
   receiving, by the server computer and from the first computer, a first authorization response message in response to the second authorization request message;
   receiving, by the server computer and from the second computer, a second authorization response message in response to the third authorization request message;
   transmitting, by the server computer and to an acquirer computer, a third authorization response message;
   receiving, by the server computer, a first clearing request message, wherein the first clearing request message comprises a transaction identifier and the transaction amount;
   deriving a first derived transaction identifier and a second derived transaction identifier from the transaction identifier;
   splitting the first clearing request message into a second clearing request message and a third clearing request message, the second clearing request message comprising the first derived transaction identifier;
   transmitting the second clearing request message to the first computer;
   transmitting the third clearing request message to the second computer, wherein the second clearing request message comprises the first adjusted transaction amount and the third clearing request message comprises the second adjusted transaction amount; and
   settling, by the server computer, the first adjusted transaction amount with the first computer and settling, by the server computer, the second adjusted transaction amount with the second computer.

2. The method of claim 1 wherein the first computer is associated with an issuer and wherein the second computer is associated with a third-party.

3. The method of claim 1 wherein the second adjusted transaction amount is associated with an offer from a third-party.

4. The method of claim 1 wherein the second adjusted transaction amount is associated with a shipping charge for the transaction.

5. The method of claim 1 further comprising:
deriving a third derived transaction identifier from the transaction identifier;
splitting, via the server computer, the first clearing request message into a fourth clearing request message; and
transmitting the fourth clearing request message to a third computer, wherein the second adjusted transaction amount is associated with an offer from a third-party, and a third adjusted transaction amount is associated with a shipping charge for the transaction.

6. The method of claim 1 further comprising:
receiving, at the server computer, a first clearing response message in response to the second clearing request message;
receiving, at the server computer, a second clearing response message in response to the third clearing request message;
sending, via the server computer, a third clearing response message to the acquirer computer, wherein the third clearing response message comprises the transaction amount.

7. The method of claim 1 wherein the first and second derived transaction identifiers each comprises an indicator indicating the respective derived transaction identifier was derived from the transaction identifier.

8. The method of claim 1 wherein the first and second derived transaction identifiers are each derived by appending one or more alphanumeric characters to the transaction identifier.

9. The method of claim 1, wherein the first clearing request message is received at the server computer from a third computer.

10. The method of claim 9, wherein the third computer is the acquirer computer.

11. A server computer, comprising:
a processor; and
a non-transitory computer-readable storage medium, comprising code executable by the processor for implementing a method for clearing a transaction, the method comprising:
receiving a first authorization request message comprising at least a transaction amount associated with the transaction;
generating a second authorization request message and transmitting the second authorization request message to a first computer, the second authorization request message comprising a first adjusted transaction amount;
generating a third authorization request message and transmitting the third authorization request message to a second computer, the third authorization request message comprising a second adjusted transaction amount;
receiving, from the first computer, a first authorization response message in response to the second authorization request message;
receiving, from the second computer, a second authorization response message in response to the third authorization request message;
transmitting, to an acquirer computer, a third authorization response message;
receiving a first clearing request message, wherein the first clearing request message comprises a transaction identifier and the first transaction amount;

deriving a first derived transaction identifier and a second derived transaction identifier from the transaction identifier;
splitting the first clearing request message into a second clearing request message and a third clearing request message, the second clearing request message comprising the first derived transaction identifier;
transmitting the second clearing request message to the first computer;
transmitting the third clearing request message to the second computer, wherein the second clearing request message comprises the first adjusted transaction amount and the third clearing request message comprises the second adjusted transaction amount; and
settling the first adjusted transaction amount with the first computer and settling the second adjusted transaction amount with the second computer.

12. The server computer of claim 1 wherein the first computer is associated with an issuer and wherein the second computer is associated with a third-party.

13. The server computer of claim 11 wherein the second adjusted transaction amount is associated with an offer from a third-party.

14. The server computer of claim 11 wherein the second adjusted transaction amount is associated with a shipping charge for the transaction.

15. The server computer of claim 11 wherein the method further comprises:
deriving a third derived transaction identifier from the transaction identifier;
splitting, via the server computer, the first clearing request message into a fourth clearing request message; and
transmitting the fourth clearing request message to a third computer, wherein the second adjusted transaction amount is associated with an offer from a third-party, and a third adjusted transaction amount is associated with a shipping charge for the transaction.

16. The server computer of claim 11 wherein the method further comprises:
receiving, at the server computer, a first clearing response message in response to the second clearing request message;
receiving, at the server computer, a second clearing response message in response to the third clearing request message;
sending, via the server computer, a third clearing response message to an acquirer, wherein the third clearing response message comprises the first transaction amount.

17. The server computer of claim 11 wherein the first and second derived transaction identifiers each comprises an indicator indicating the respective derived transaction identifier was derived from the transaction identifier.

18. The server computer of claim 11 wherein the first and second derived transaction identifiers are each derived by appending one or more alphanumeric characters to the transaction identifier.

19. The server computer of claim 11, wherein the first clearing request message is received at the server computer from a third computer.

20. The server computer of claim 19, wherein the third computer is the acquirer computer.

* * * * *